United States Patent [19]

Eastridge et al.

[11] Patent Number: 4,528,735
[45] Date of Patent: Jul. 16, 1985

[54] TIRE TOOL

[76] Inventors: Victor R. Eastridge, P.O. Box 3291, Scottsdale, Ariz. 85257; Orville Van dewege, 1932 E. Richards Dr., Tempe, Ariz. 85282; Alan D. Akin, 425 E. Brown Rd., #25, Mesa, Ariz. 85203

[21] Appl. No.: 594,024
[22] Filed: Mar. 27, 1984
[51] Int. Cl.³ .............................. B25P 19/04
[52] U.S. Cl. .......................... 29/221.5; 29/267
[58] Field of Search ........... 29/221.5, 267, 264; 81/15.2; 254/131

[56] References Cited

U.S. PATENT DOCUMENTS

| | | | |
|---|---|---|---|
| 2,940,167 | 6/1960 | Boyer et al. | 29/221.5 |
| 3,255,520 | 6/1966 | Jerdon | 29/221.5 |
| 3,928,902 | 12/1975 | Seims et al. | 29/221.5 |

Primary Examiner—Robert C. Watson
Attorney, Agent, or Firm—Herbert E. Haynes, Jr.

[57] ABSTRACT

A tire tool for inserting a valve stem in a wheel and holding the valve stem in place during the tire inflation operations. The tool includes a body which is threaded onto the valve stem and has an air passage through which air is passed during tire inflation operations. A handle is pivotably attached to the body for movement into engagement with the rim of the wheel to apply leverage on the body for valve stem insertion and holding purposes. The tool further includes a releasable locking device which holds the body in alignment with the handle to facilitate threaded attachment of the body to the valve stem.

17 Claims, 4 Drawing Figures

SUMMARY OF THE INVENTION

In accordance with the present invention, a new and improved tire tool is disclosed which facilitates the insertion and/or holding of valve stems against unintentional displacement during tire inflation operations and is suitable for use with valve stems of the type used with tubeless tires and those provided on inner tubes for use in tube-tire assemblies.

The improved tire tool includes an elongated body which is preferably of cylindrical configuration and has an axial bore, or air passage, formed therethrough. One end of the axial air passage is internally threaded for mounting on the end of a valve stem and a fixed rod, or pin, is concentrically mounted in that end for automatically depressing, i.e., opening, the valve core of the valve stem when the body is attached thereto. The opposite end of the body is adapted to receive the end fitting of a high pressure air hose, and a conventional valve core is demountably carried in the axial air passage adjacent the opposite end thereof for normally closing the air passage of the body and opening the air passage upon connection of the air hose to the body.

The body of the tire tool is mounted in a special manner in one end of an elongated handle so as to be pivotably movable about an axis transverse to the handle and so as to be axially movable relative to the handle. The one end of the handle is bifurcated and has a blind axial bore which extends from the bifurcated end into the handle, and the body is mounted between the spaced tines of the bifurcated end on a pin which is transversely carried on the body with the opposite ends of the pin passing through elongated holes, or slots, which are aligningly formed through the tines of the bifurcated handle end. In this manner, the body is pivotably movable about the axis of the mounting pin, and the entire body can be moved, to a limited extent, along the longitudinal axis of the handle by moving the body so that the mounting pin moves in the elongated holes formed in the tines of the bifurcated end of the handle.

When the body is pivotably moved into axial alignment with the longitudinal axis of the handle and the body is moved axially toward the handle, the air hose receiving end of the body will move into the blind axial bore provided in the handle which captively holds the body against pivotable movement. Means is provided in the blind bore to releasably hold the body in the aligned captively held position, and when so positioned, the tire tool may be quickly and easily threadingly attached to the end of the valve stem in a manner which minimizes cross threading, and the like. Both the body and the adjacent end of the handle of the tire tool may be sized so that they can be passed through the valve stem receiving hole provided in the rim of a wheel, so that the tool may be threadingly attached to the valve stem which is located proximate the hole but is not mounted therein so that the tool can be used to pull the valve stem into place. Of course, the tool may be threadingly attached to a partially installed valve stem and used to complete the installation or can be attached to a completely installed valve stem and employed as a holding tool during inflation operations.

Once the threaded attachment of the tire tool to the valve stem has been completed, the body is moved axially out of the blind bore of the handle to free the handle for pivotable movement. The handle is then used as a lever by its being moved into bearing engagement with the rim of the wheel which acts as a fulcrum to provide leverage for pulling the valve stem into the installed position and/or holding it against unintentional displacement while the tire is inflated by the passage of high pressure air from the air hose through the axial air passage of the body of the tire tool.

Accordingly, it is an object of the present invention to provide a new and improved tire tool for use in inserting and/or holding valve stems in place during tire inflating operations.

Another object of the present invention is to provide a new and improved tire tool for use in inserting and/or holding valve stems in place during tire inflating operations with the tool being ideally suited for use with valve stems of the type used in tubeless tires and those provided on inner tubes that are used in tube-tire assemblies.

Another object of the present invention is to provide a new and improved tire tool of the above described character which includes a body that is threadingly mountable on the end of a valve stem with the body being pivotably carried on one end of a handle which serves as a lever for valve stem insertion purposes and to hold the valve stem against displacement while the tire is being inflated by the passage of high pressure air through an axial air passage formed through the body.

Another object of the present invention is to provide a new and improved tire tool of the above described type wherein the body of the tire tool may be moved into axial alignment with the handle and releasably locked in that position to facilitate threaded attachment of the tire tool to a valve stem.

Still another object of the present invention is to provide a new and improved tire tool of the type described above wherein the axial air passage formed through the body of the tire tool has a pin fixedly carried concentrically in the end thereof which is for threaded attachment to the valve stem for automatically opening the valve core of the stem upon attachment of the body to the stem.

Yet another object of the present invention is to provide a new and improved tire tool of the above described character wherein the axial air passage formed through the body of the tire tool has a valve core in the end thereof which is adapted for receiving the end fitting of a high pressure air hose to hold the air passage closed in the absence of the air hose and to automatically open the air passage of the body upon attachment of the air hose thereto.

The foregoing and other objects of the present invention as well as the invention itself, may be more fully understood from the following description when read in conjunction with the accompanying drawings.

DESCRIPTION OF THE PREFERED EMBODIMENTS

Figure 1:
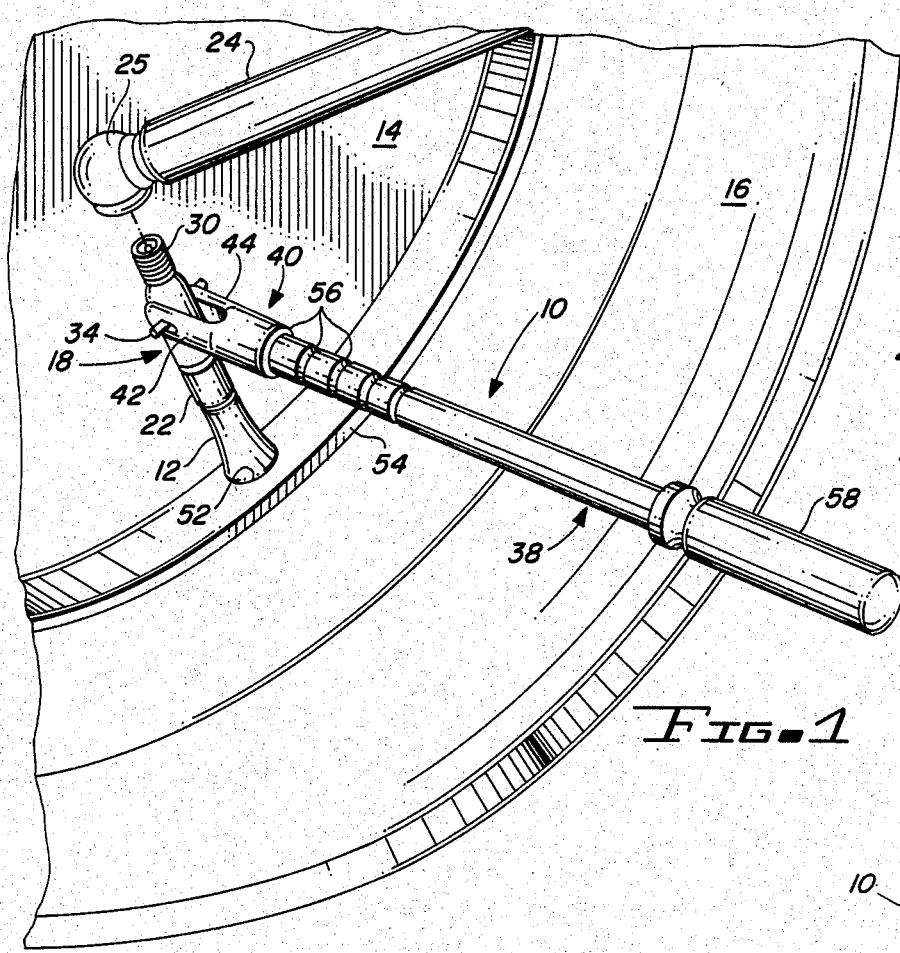
FIG. 1 is a perspective view of the tire tool of the present invention in an in-use position of being attached to a valve stem of a typical fragmentarily illustrated wheel and tire assembly.
Figure 2:
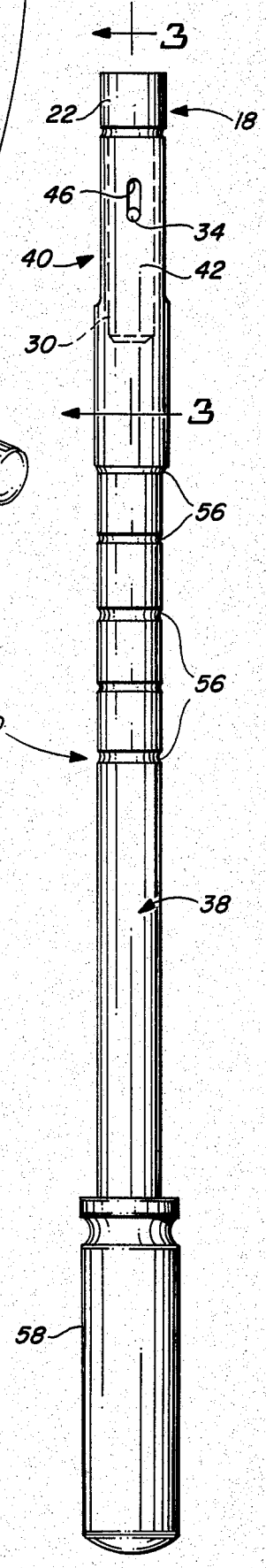
FIG. 2 is an enlarged elevational view of the tire tool of the present invention.

Referring more particularly to the drawings, FIGS. 1 and 2 show the tire tool of the present invention which is indicated in its entirety by the reference numeral 10. FIG. 1 shows the tire tool 10 as being attached to a typical valve stem 12 of a wheel 14 and tire 16 assembly for installation and/or holding of the valve stem as will hereinafter be described in detail.

Figure 3:
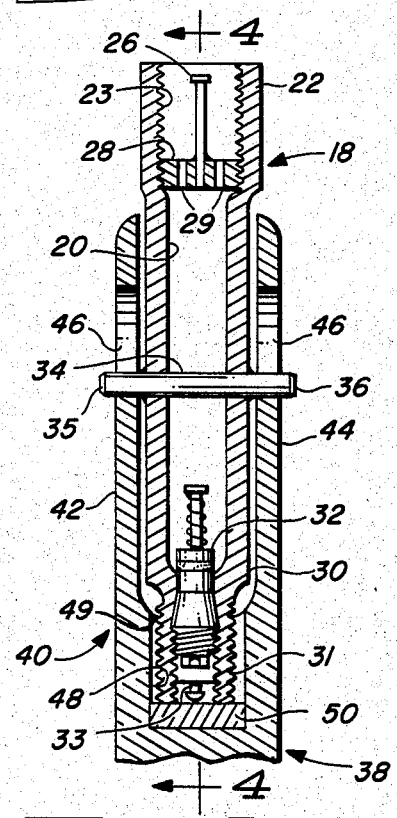
FIG. 3 is an enlarged fragmentary sectional view taken along the line 3—3 of FIG. 2.

The tire tool 10 includes an elongated body 18 which is preferably of substantially cylindrical configuration and, as seen in FIG. 3, has an axial bore 20 formed therethrough which serves as an air passage for reasons which will become apparent as this description progresses. The cylindrical body 18 has a diametrically enlarged end 22 which is internally threaded as at 23 for attachment to the extending end of the valve stem 12 as shown in FIG. 1.

As is well known, all valve stems have a valve core (not shown) therein which is normally closed to prevent the escape of air from the tire. Such valve cores are automatically opened upon the connection of the end fitting of a high pressure air hose thereto, such as the fragmentarily illustrated air hose 24 and end fitting 25 shown in FIG. 1. During tire servicing operations, sometimes the valve core is left in the valve stem and sometimes it is removed depending on the type of servicing operation. In order to utilize the full capabilities of the tire tool 10, the valve core of the valve stem 12, if left within the stem, must be opened. Therefore, the body 18 has a pin 26 concentrically located in the air passage bore 20 proximate the valve stem attachment end 22 thereof. When the body 18 is threadingly attached to the valve stem 12, the pin 26 will be moved into engagement with the valve core thereof and will hold the valve core open in the same manner as it is held open by the end fitting 25 of the high pressure air hose 24. The pin 26 may be located and held in place by any suitable means, such as the plug 28 which is threadingly carried in the threaded portion 23 of the air passage bore and is provided with a plurality of apertures 29 for the free passage of air therethrough.

The opposite end 30 of the cylindrical body 18 is adapted to receive the end fitting 25 of the high pressure air hose 24. Although many existing air hose/fitting assemblies do not require that they be threadingly attached to the device to which they are to supply air, some fittings currently being used are designed for threaded attachment. For this reason, the air hose receiving end 30 of the cylindrical body 18 is preferably externally threaded as at 31, so that it is capable of being used with all types of commonly used high pressure air hoses and fittings. In addition to the external threads 31 provided on the air hose receiving end 30, internal threads are formed in the air passage bore 20 at that end 30, and a valve core 32 is demountably carried therein. The valve core 32 is of the type hereinbefore discussed as being commonly used in valve stems. Thus, the valve core 32 is a conventional and well known normally closed device which is automatically opened to the passage of air upon the connection of the high pressure air hose 24 to the body 18. The valve core 32 may be manually opened by depressing the plunger 33 thereof or the valve core may be removed so that various types of tire servicing operations may be accomplished with the tire tool 10 in the mounted position shown in FIG. 1.

The cylindrical body 18 is also provided with a pin 34 which is fixedly mounted intermediate the opposite ends thereof and passes transversely therethrough so as to have its ends 35 and 36 extending oppositely from the body.

The tire tool 10 further includes an elongated handle 38 having a bifurcated end 40 which is defined by a spaced apart pair of tines 42 and 44. Each of the tines 42 and 44 has an elongated slot 46 formed therethrough with the slots being aligned with each other and extending longitudinally of their respective tines 42 and 44.

The transverse pin 34 provided on the body 18 has its opposite ends 35 and 36 extending loosely through the slots 46 of the tines 42 and 44, respectively, so that the body is pivotably and axially movably mounted in the bifurcated end 40 of the handle.

Figure 4:
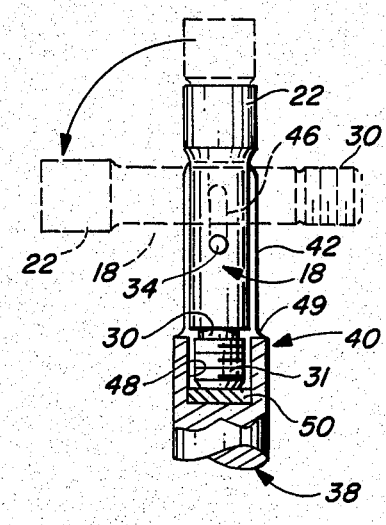
FIG. 4 is a fragmentary sectional view taken along the line 4—4 of FIG. 3.

The blind bore 48 is axially formed in the handle 38 so as to open into the bight portion 49 of the bifurcated end 40 of the handle. When the body 18 is in axial alignment with the handle 38 and is moved from an extended position shown in dashed lines in FIG. 4 to a retracted position shown in solid lines, the air hose receiving end 30 of the body 18 will be captively received in the blind bore 48. Means 50, such as a magnet, is mounted in the bottom of the blind bore 48 so as to releasably hold the body in the solid line retracted position and thus hold it against pivotable able movement.

It will be obvious that the same objective of releasably holding the body 18 in axial alignment with the handle 38 can be accomplished in other ways than that shown and described above. For example, the elongated slots 46 could be replaced by apertures (not shown) so that the body would still be pivotable but not axially slidable. The blind bore 48 in this example would be modified to include a laterally opening slot (not shown) through which the air hose receiving end 30 of the body would move into the bore upon pivotable movement of the body. The means 50 in the form of the illustrated magnet could still be used to releasably hold the body in the axially aligned position or could be replaced with a detent structure (not shown) of the well known type.

In any case, the releasably held axially retracted position of the body 18 relative to the handle 38 is used to facilitate threaded attachment of the tire tool 10 to the valve stem 12. Such attachment may be made at any time in accordance with the desired procedure and type of service operation being performed. For example, a valve stem 16 may be located on one side of the rim of the wheel 14, and the tire tool 10 passed part way through the valve stem receiving hole 52 of the wheel, and attached to the valve stem to guide and pull it into place. It will be noted that the body 18 and the handle 38 are preferably sized to allow partial insertion of the tool through the hole 52 to accomplish the above described type of valve stem insertion operation. The tire tool 10 may also be attached to a partially or fully inserted valve stem as needed or desired.

When the tire tool is attached to the extending end of the valve stem 12, the handle 38 is pulled to move it axially away from the attached body 18 to move the body to its extended position thereby freeing the handle and the body for pivotable movement relative to each other. When free, the handle 38 is moved to bring it into bearing engagement with the lip 54 of the wheel 14 so that the handle can be used as a lever with the lip 54 serving as a fulcrum. It will be noted that the handle 38 is provided with a plurality of annular grooves 56 that are spacedly arranged along the length of the handle proximate the bifurcated end thereof. The grooves 56 will receive the lip 54 to retard slipping and the plurality of grooves make it possible for the lips of variously sized wheels to move into engagement with one of the grooves.

TIRE TOOL

BACKGROUND OF THE INVENTION

1. Field of the Invention

This invention relates generally to tools and more particularly to a tire tool for pulling a valve stem into place in the rim of a wheel and holding it against displacement during inflation of the tire.

2. Description of the Prior Art

As is well known in the tire servicing art, the installation of valve stems, of both the tube-type tires and tubeless tires, can be a troublesome and often frustrating task.

In the case of tubeless tires, a valve stem is inserted through a hole provided in the rim of the wheel from the periphery of the rim so that the valve stem extends more or less toward the center of the wheel. The type of valve stem used for this purpose requires that a considerable amount of valve stem insertion force be applied and special valve stem insertion tools are customarily used for this purpose, such as the one disclosed in U.S. Pat. No. 2,940,167. After the valve stem has been inserted, the tool is removed and the tire is then mounted on the periphery of the wheel and is now ready for inflation.

In the case of tube-type tires, the tube is positioned in the tire and the tube-tire assembly is brought into a preliminary, or half mounted position on the periphery of the wheel. When in this position, the valve stem is either pushed through the hole by the hand of the installer or is alternately pulled through the hole by what is sometimes referred to as a fishing tool. A fishing tool is a device which is inserted through the hole in the rim in a direction toward the half mounted tube-tire assembly, and is threadingly attached to the extending end of the valve stem and when attached, is used to pull the valve stem into place within the hole provided in the rim. In either case, when the valve stem is in place, the tire and tube mounting operation may then be completed and the tube-tire assembly is ready for inflation.

When the end, or outlet fitting of a high pressure air hose is positioned on the installed valve stem for inflation purposes, some interconnecting force must be applied to prevent air leakage and this force can, and often does, push the valve stem back through the hole. When this valve stem displacement occurs, it can sometimes be remedied by using a fishing tool, but all to often, the tubeless tire, or the tube-type tire assembly, must be removed from the wheel so that the mounting operation can be started all over again.

To prevent valve stem displacement, an experienced installer will hold the valve stem with a pair of pliers during the inflation operation. Such a practice is an awkward operation which sometimes causes mutilation of the valve stem, and sometimes the pliers will slip thus allowing the valve stem to be displaced.

For this reason, several prior art tire tools have been proposed none of which, to the best of our knowledge, have received any degree of commercial success.

In the prior art tool disclosed in U.S. Pat. No. 2,124,836, a substantially cylindrical body having an axial bore is threadingly mounted on an installed valve stem to bring one end of the body into bearing engagement with the rim of the wheel and thereby hold the valve stem against displacement. Air is supplied for inflation purposes through the axial bore of the tool. Although this prior art tool is a substantial improvement over the plier holding technique, it cannot be used to pull a valve stem into place and cannot be used for valve stem fishing purposes, and is only suitable for use with valve stems of a very limited range of length dimensions.

Other prior art tire tools are disclosed in U.S. Pat. Nos. 2,282,387, and 2,579,657, as including cylindrical bodies having axial bores formed therethrough with one end of these bores being internally threaded. These tools are threadingly mounted on the extending end of an installed valve stem and axially applied pulling forces are exerted on the tools while air is passed through their axial bores for inflation purposes. As was the case in the prior art tool discussed immediately above, these tools are strictly valve stem holding tools and cannot be used for valve stem fishing operations, and cannot be used to pull the valve stem into place within the hole provided in the wheel's rim. And, the valve stem holding capability of these prior art tools is awkward to accomplish due to the user being required to apply an axial pulling force on the tools during inflation operations.

U.S. Pat. No. 2,679,654 discloses a tire tool having an elongated flexible hose with a fitting on one end for threaded attachment to the extending end of a valve stem and another fitting at its opposite end for demountable attachment to a special handle device which is provided with an axial bore for air passage purposes. This tool can be used in two different ways. First, it can be attached to an installed valve stem, or used to pull a partially installed valve stem into place, and used as a holding tool by the application of an axial pulling force. Secondly, the flexible hose with the handle removed, can be attached to the valve stem and passed through the hole provided in the wheel rim whereupon an axial pulling force is applied to guide and pull the valve stem into place, and, when accomplished, the special handle is installed on the extending end of the hose and air is passed therethrough for tire inflation purposes. In either case, the user must exert the awkward axial pulling force to accomplish the valve stem holding function during tire inflation. The second type of usage of this tool will work quite well with tube-tire assemblies, but is inadequate for the installation of valve stems of the tubeless type used with tubeless tires due to the considerable amount of force required for installation of such valve stems. Another shortcoming of this second method of use of this prior art tool is the extra operations that the user must accomplish, that is removing and reinstalling the special handle for each such use of the tool.

The hereinbefore mentioned special tool of U.S. Pat. No. 2,940,167, which is used for installation of valve stems of the type used in tubeless tires, includes a cylindrical body having an internally threaded blind bore which is threadingly attached to the valve stem. The body is pivotably carried on one end of an elongated handle which is used as a lever by being placed in bearing engagement with the rim of the wheel to provide leverage for pulling this type of valve stem into place. This tool is, however, simply an installation tool and must be removed when tire inflation is to be accomplished.

Therefore, a need exists for a new and improved tire tool which overcomes some of the problems and shortcomings of the prior art.

By application of a force, downward in FIG. 1, on the handle grip 58 provided on the opposite end of the handle of the tire tool, the resulting leverage will pull the valve stem 12 into place to accomplish a valve stem insertion operation. That same type of force can be applied to hold the valve stem 12 in place to prevent displacement thereof when the tire is being inflated.

While the principles of the invention have now been made clear in the illustrated embodiment, there will be immediately obvious to those skilled in the art, many modifications of structure, arrangements, proportions, the elements, materials, and components used in the practice of the invention, and otherwise, which are particularly adapted for specific environments and operation requirements without departing from those principles. The appended claims are therefore intended to cover and embrace any such modifications within the limits only of the true spirit and scope of the invention.

What we claim is:

1. A tire tool for installing a valve stem in an opening provided proximate the rim of a wheel and for holding the valve stem against displacement during tire inflation operations, said tire tool comprising:
   (a) an elongated body having a first end for demountable attachment to the valve stem and a second end for demountably receiving the end fitting of a high pressure air hose, said body having an axial air passage through which air moves during tire inflation operations;
   (b) an elongated handle having a bifurcated end and a hand grip end; and
   (c) means for movably mounting said body in the bifurcated end of said handle so that when said body is attached to the valve stem said handle is movable relative thereto into bearing engagement with the rim of the wheel to provide a fulcrum for use of the handle as a lever to facilitate valve stem installation and holding of the valve stem against displacement during tire inflation operations.

2. A tire tool as claimed in claim 1 and further comprising valve means in the air passage of said body, said valve means being operable between a normally closed position wherein the air passage of said body is closed and an open position wherein the air passage of said body is open.

3. A tire tool as claimed in claim 1 and further comprising a valve core in the air passage of said body and operable between a normally closed position wherein the air passage of said body is closed and an open position wherein the air passage of said body is open, said valve core being proximate the second end of said body so that upon receipt of the end fitting of the high pressure air hose said valve core will be operated to the open position thereof.

4. A tire tool as claimed in claim 1 and further comprising a pin concentrically disposed in the air passage of said body proximate the first end thereof for opening the valve core of the valve stem when said body is demountably attached thereto.

5. A tire tool as claimed in claim 1 and further comprising groove means formed in spaced increments along at least a part of the length of said handle for receiving the rim of various sized wheels.

6. A tire tool as claimed in claim 1 wherein the axial air passage of said body is internally threaded at the first end of said body for threaded attachment to the valve stem.

7. A tire tool as claimed in claim 6 and further comprising means for releasably holding said body in axially aligned relationship with said handle with the first end of said body facing away from said handle to facilitate threaded attachment of said body to the valve stem.

8. A tire tool as claimed in claim 1 and further comprising means in said handle for selectively releasably holding said body in an axially aligned position relative to said handle with the first end of said body facing away from said handle.

9. A tire tool as claimed in claim 8 wherein said means for movably mounting said body in the bifurcated end of said handle allows relative pivotable movement of said body and said handle for movement of said handle into bearing engagement with the rim of the wheel and allows axial movement of said handle and said body toward and away from each other for selectively moving said body into and out of engagement with said means in said handle for releasably holding said body in an axially aligned position relative to said handle.

10. A tire tool as claimed in claim 9 wherein said means in said handle for releasably holding said body in an axially aligned position relative to said handle comprises:
   (a) said handle having a blind bore extending from the bight portion of the bifurcated end thereof longitudinally toward the hand grip end; and
   (b) magnet means in the blind bore of said handle for releasably holding said body in the axially aligned position when said body and said handle are pivotably moved into an axially aligned position and are axially moved toward each other.

11. A tire tool as claimed in claim 1 and further comprising:
   (a) said bifurcated end of said handle being defined by a spaced pair of tines which extend longitudinally from said handle;
   (b) each of said pair of tines having an elongated close ended slot formed therein with said slots being in alignment with each other and disposed longitudinally of their respective ones of said pair of tines;
   (c) said body having a transverse pin which has extending opposite ends that are loosely positioned in different ones of said slots of said pair of tines to allow relative pivotable movement of said body and said handle and relative axial movement of said body and said handle toward and away from each other;
   (d) a blind bore formed in said handle and extending axially into said handle from the bight portion of the bifurcated end for receiving the second end of said body when said body and said handle are in axial alignment and are moved axially toward each other; and
   (e) means in the blind bore of said handle for releasably holding said body in the axially aligned position when the second end of said body is received in said blind bore.

12. A tire tool as claimed in claim 11 wherein said means in said blind bore is a magnet.

13. A tire tool for installing a valve stem in an opening provided proximate the rim of a wheel and for holding the valve stem against displacement during tire inflation operations, said tire tool comprising:
   (a) an elongated body having an axial bore which is internally threaded at one end of said body for attachment to the valve stem with the other end of said body being adapted to receive the end fitting of a high pressure air hose;

(b) a normally closed valve in the axial bore of said body proximate the other end thereof, said valve being moved to an open position upon receipt of the end fitting of the high pressure air hose on the other end of said body;

(c) a pin concentrically mounted in the axial bore of said body at the one end thereof for opening the valve core of the valve stem upon threaded attachment of said body to the valve stem;

(d) an elongated cylindrical handle having a bifurcated end defined by a bight portion and a transversely spaced pair of tines which extend longitudinally of said handle, said pair of tines having aligned elongated slots formed therein;

(e) a pivot pin mounted transversely of said body and having its opposite ends loosely disposed in the slots formed in the tines of the bifurcated end of said handle to allow pivotable movement and axial movement of said body in the bifurcated end of said handle; and (f) means in said handle for selectively and releasably holding said body in axially aligned relationship with that handle when said body is pivotably moved to an axially aligned position with the one end thereof facing away from said handle and said body is axially moved toward said handle.

14. A tire tool as claimed in claim 13 wherein said means in said handle comprises:

(a) said handle having a blind bore formed axially therein and opening into the bight portion of the bifurcated end of said handle; and (b) holding means in said blind bore for releasably holding the other end of said body.

15. A tire tool as claimed in claim 13 wherein said holding means is a magnet.

16. A tire tool as claimed in claim 13 and further comprising a plurality of annular grooves formed in spaced increments along at least a part of the length of said handle.

17. A tire tool as claimed in claim 13 and further comprising a handle grip on the opposite end of said handle.

* * * * *